(12) United States Patent
Nygren et al.

(10) Patent No.: US 8,909,840 B2
(45) Date of Patent: Dec. 9, 2014

(54) DATA BUS INVERSION CODING

(75) Inventors: Aaron J. Nygren, Truckee, CA (US); Anwar Kashem, Cambridge, MA (US); Bryan Black, Spicewood, TX (US); James Michael O'Connor, Austin, TX (US); Warren Fritz Kruger, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 202 days.

(21) Appl. No.: 13/330,482

(22) Filed: Dec. 19, 2011

(65) Prior Publication Data

US 2013/0159584 A1 Jun. 20, 2013

(51) Int. Cl.
G06F 13/28 (2006.01)

(52) U.S. Cl.
USPC ................... 710/305; 710/35; 341/58

(58) Field of Classification Search
USPC ............... 710/305, 35; 341/58, 59; 375/286
See application file for complete search history.

(56) References Cited

U.S. PATENT DOCUMENTS

| | | | |
|---|---|---|---|
| 5,719,812 A * | 2/1998 | Seki et al. ............... | 365/194 |
| 6,459,313 B1 | 10/2002 | Godbee et al. | |
| 6,584,526 B1 | 6/2003 | Bogin et al. | |
| 7,495,587 B2 | 2/2009 | Bae | |
| 7,519,893 B2 | 4/2009 | Newcomb et al. | |
| 7,701,368 B2 | 4/2010 | Hollis | |
| 7,869,525 B2 * | 1/2011 | Macri et al. ............... | 375/257 |
| 2002/0156953 A1 | 10/2002 | Beiley et al. | |
| 2003/0158981 A1 | 8/2003 | LaBerge | |
| 2003/0217243 A1 | 11/2003 | Chang | |
| 2004/0068594 A1 | 4/2004 | Asaro et al. | |
| 2005/0182894 A1 * | 8/2005 | LaBerge ............... | 711/105 |
| 2006/0184757 A1 * | 8/2006 | Yeh et al. ............... | 711/167 |
| 2009/0174455 A1 | 7/2009 | Dimitriu et al. | |
| 2009/0313521 A1 | 12/2009 | Hollis | |
| 2010/0026533 A1 | 2/2010 | Hollis | |
| 2010/0077125 A1 | 3/2010 | Park et al. | |
| 2011/0252171 A1 | 10/2011 | Dearth et al. | |

OTHER PUBLICATIONS

User's Manual: Introduction to GDDR5 SGRAM, Elpida Memory, Inc., Mar. 2010, 24 pages.
Timothy M. Hollis, "Data Bus Inversion in High-Speed Memory Applications," IEEE Transactions on Circuits and Systems—II: Express Briefs, vol. 56, No. 4, Apr. 2009, pp. 300-304.
International Search Report and Written Opinion in Application No. PCT/US2012/070689 dated Jul. 19, 2013, 14 pages.

* cited by examiner

*Primary Examiner* — Glenn A Auve
(74) *Attorney, Agent, or Firm* — Meyertons, Hood, Kivlin, Kowert & Goetzel, P.C.

(57) ABSTRACT

Techniques are disclosed relating to data inversion encoding. In one embodiment, an apparatus includes an interface circuit. The interface circuit is configured to perform first and second data bursts that include respective pluralities of data transmissions encoded using an inversion coding scheme. In such an embodiment, the initial data transmission of the second data burst is encoded using the final data transmission of the first data burst. In some embodiments, the first and second data bursts correspond to successive write operations or successive read operations to a memory module from a memory PHY.

20 Claims, 6 Drawing Sheets

DATA BUS INVERSION CODING

BACKGROUND

1. Technical Field

This disclosure relates generally to integrated circuits, and, more specifically, to data encoding.

2. Description of the Related Art

An interconnect may include multiple signal lines (i.e., channels) for conveying bits of information from a transmitting device to a receiving device. In some instances, rapidly charging and discharging the lines (i.e., switching) to transmit information at high frequencies may produce excessive transient currents, which may introduce noise into the data signals. This noise, in turn, may reduce overall speed and increase power consumption of the interconnect.

Various encoding algorithms have been developed to minimize the amount of switching. Data bus inversion (DBI) is one algorithm in which a transmitting device will invert a transmission of N bits if the inverted transmission will cause less switching than the non-inverted transmission. In one implementation referred to as DBI DC mode encoding, a transmitting device inverts a transmission of N bits if the number of bits having a particular logical value (e.g., a logical zero) is greater than N/2. Inverting bits in this manner guarantees that the number of switched lines does not exceed N/2. In another implementation referred to as AC mode encoding, a transmitting device may compare a transmission of N bits with a previous transmission and invert the transmission if the number of different bits from the previous transmission exceeds N/2. Inverting bits in this manner also limits the number of switched lines to N/2.

SUMMARY OF EMBODIMENTS

The present disclosure describes systems and methods relating to data bus inversion encoding.

In one embodiment, an apparatus is disclosed. The apparatus includes an interface circuit configured to perform first and second data bursts that include respective pluralities of data transmissions encoded using an inversion coding scheme. An initial data transmission of the second data burst is encoded using a final data transmission of the first data burst.

In another embodiment, a method is disclosed. The method includes performing a first data burst that includes a first plurality of data transmissions, including a final data transmission, where data in each of the plurality of data transmissions is encoded using data bus inversion (DBI) coding. The method further includes performing a second data burst of a second plurality of DBI-coded data transmissions, including an initial data transmission. The initial data transmission of the second data burst is encoded using the final data transmission of the first data burst.

In yet another embodiment, a computer readable storage medium is disclosed. The storage medium includes a data structure, which is operated upon by a program executable on a computer system. The program operating on the data structure is executable to perform a portion of a process to fabricate an integrated circuit including circuitry described by the data structure. The circuitry described by the data structure includes an interface circuit configured to perform first and second data bursts that include respective pluralities of data transmissions encoded using an inversion coding scheme. An initial data transmission of the second data burst is encoded using a final data transmission of the first data burst.

In still another embodiment, an apparatus is disclosed. The apparatus includes an interface circuit configured to transmit data bursts to another interface circuit via an interconnect. The interface circuit is configured to reset a first set of bit lines of the interconnect during a first cycle and a second set of bit lines of the interconnect during a second cycle.

Figure 1:
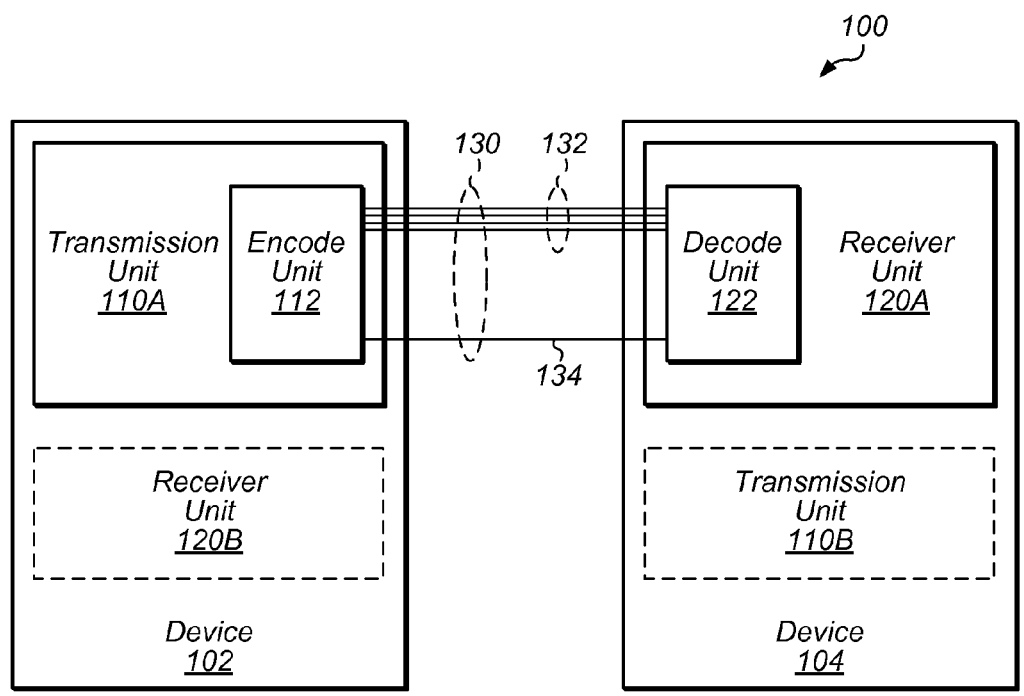
FIG. 1 is a block diagram illustrating one embodiment of a system configured to use data bus encoding.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

DETAILED DESCRIPTION

The present disclosure describes techniques for improving performance of data bus inversion encoding. As will be described below, in one embodiment, a device is configured to perform successive data bursts over an interconnect that are encoded using data bus inversion. Instead of resetting the interconnect to a default state between each burst and encoding a burst based on the default state, the device may use the last transmission of a burst to encode the initial transmission of the next burst. In many instances, encoding bursts in this manner reduces the amount of switching and thus, reduces the risks of transient currents, which may introduce noise. Reducing the amount of switching, in some embodiments, may also reduce the power consumption of the device.

In some embodiments, the device is further configured to reset portions of the interconnect bit lines over multiple cycles (as opposed to resetting the entire interconnect at the same time). In many instances, this further reduces the risks of transient currents.

Turning now to FIG. 1, a block diagram of a system 100 is depicted. System 100 is one embodiment of a system configured to use data bus inversion (DBI) encoding. In the illustrated embodiment, system 100 includes a device 102 and a device 104. Device 102 includes a transmission unit 110A, which includes an encode unit 112. Device 104 includes a receiver unit 120A, which includes a decode unit 122. (Transmission units 110 and receiver units 120 may be referred to herein as interface circuits.) As will be described below, in various embodiments, transmission unit 110A is configured to send DBI encoded information from device 102 to receiver unit 120A in device 104 via interconnect 130. In some embodiments, device 104 may also include a transmission unit 110B for sending information to a receiving unit 120B in device 102. In one embodiment, transmission units 110A and 110B both use interconnect 130 (i.e., interconnect 130 may be a bidirectional interconnect that handles traffic in both directions). In another embodiment, transmission units 110A and 110B may communicate via separate unidirectional interconnects 130.

Devices 102 and 104 may be any devices that may communicate using data bus inversion encoding. In various embodiments, devices 102 and 104 may be components in a computer system. For example, in some embodiments, device 102 may be a processing unit, device 104 may be memory module, and interconnect 130 may be a system bus. As will be described below, in one embodiment, a memory controller interface (e.g., a physical memory interface circuit PHY) of the processor and a memory module may include respective transmission and receiver units to perform write and read operations. The processor may be any suitable type of processing unit such as a central processing unit (CPU), a coprocessor, an arithmetic processing unit, a graphics processing unit (GPU), a digital signal processor (DSP), etc. The processor may be a superscalar processor with a single or multiple pipelines. The processor may include a single or multiple cores that are each configured to execute instructions. The memory may also be any suitable type of memory including those described below in conjunction with FIG. 6. In some embodiments, device 104 may also be a bridge controller (e.g., a northbridge or southbridge), a storage device (e.g., hard drives, optical drives, flash drives, storage arrays, SANs, etc.), a network interface device (e.g., to a local or wide-area network), a user interface device (e.g., display devices, sound devices, printers, etc.), etc. In some embodiments, devices 102 and 104 may be separate cores within a processing unit or separate processing units in a computer system. Accordingly, in one embodiment, system 100 may be a communication network, where devices 102 and 104 may be routers, switches, end devices, etc. In another embodiment, system 100 is a controller-area network (CAN), where devices 102 and 104 may correspond to one or more vehicle components. In short, devices 102 and 104 may be any suitable devices.

Transmission units 110, in one embodiment, are configured to send information to receiver units 120 in the form of data bursts. As used herein, the term "data burst" has its ordinary and accepted meaning in the art, and includes a plurality of transmissions performed in close proximity to send portions of a set of data. For example, in one embodiment, transmission unit 110 may be configured to send a set of 32-bytes of data as four bursts, each burst including eight transmissions over an 8-bit bus (4*8*8=256 bits or 32 bytes). In embodiments in which transmission units 110 are used to facilitate performance of read and write operations between a processor and memory, transmission units 110 may be configured to perform one or more respective bursts for each data operation. Accordingly, in one embodiment, if device 102 is a processor and device 104 is a memory module, transmission unit 110A may perform one or more bursts for each issued write operation, and transmission unit 110B may perform one or more bursts for each issued read operations. Thus, a given transmission of a burst may include a portion of the data being written or read.

In one embodiment, transmission unit 110 uses encode unit 112 to encode data for each transmission using data bus inversion (DBI) coding. In the illustrated embodiment, transmission unit 110A may transmit the encoded data over data channels/signal lines 132 of interconnect 130. Encode unit 112 may further indicate whether bits of a transmission have been inverted via an inversion channel/signal line 134. Accordingly, receiver unit 120 may be configured to receive encoded data bursts and decode the transmissions based on the inversion indications provided over channel 134. (As used herein, the phrase "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.)

In various embodiments, encode unit 112 is configured to encode a given data burst based on the previous data burst unless a reset event occurs (described more below). Accordingly, in various embodiments, encode unit 112 may encode a burst of a write operation based on the burst of a previous write operation (or a previous read operation, in some embodiments) or encode a burst of a read operation based on the burst of a previous read operation (or a previous write operation, in some embodiments). To encode successive bursts, encode unit 112, in various embodiments, is configured to encode the initial data transmission of the second data burst based on the final data transmission of a first data burst. In some embodiments, encode unit 112 may be configured to store the bits from the last transmission of a data burst and compare the stored bits with the bits in the initial transmission of the next burst. Accordingly, in one embodiment, encode unit 112 may invert the bits of a set of data if the number of differing bits is greater than one half—in other words, more than N/2 differences for a N-bit transmission. For example, a data burst may include an initial transmission having the binary value 11110000. If the binary value for the next transmission is 11101111, encode unit 112 may invert the bits to produce the binary value 00010000. This inverted value is then transmitted instead of the original value since transmitting the inverted value will cause only three channels 132 to be switched. As noted above, encoding bursts in this manner may be less likely to produce transient currents than encoding the initial transmission of each burst from a default state (e.g., encoding from a value of all zero bits).

In one embodiment, transmission unit 110A is further configured to facilitate the reset of interconnect 130. (In other embodiments, another unit or units in devices 102 and/or 104 may be configured to facilitate a reset of interconnect 130). Transmission unit 110A may determine to reset interconnect 130 based on a variety of events. In one embodiment, if interconnect 130 is a bidirectional interconnect permitting either transmission unit 110A or unit 110B to driver traffic, transmission unit 110A may perform a reset when traffic over interconnect 130 changes directions (i.e., transmission unit 110B begins driving traffic over interconnect 130 after unit 110A was driving traffic, or vice versa.). In embodiments in which transmission units 110 are used to perform of read and write operations, the driving transmission unit 110 may change upon transition from performing a write operation to a read operation or from performing a read operation to a write operation. In one embodiment, transmission unit 110A may also perform a reset if interconnect 130 is going to be idle for a given period because transmission units 110 are not generating traffic. In one embodiment, interconnect 130 and/or transmission unit 110 may enter an idle state when a processor has stopped performing read or write operations for a period (e.g., if the processor enters an idle power state and memory enters an auto refresh mode).

In some embodiments, a transmission unit 110 may be configured to perform reset of interconnect 130 by discharging (or charging) each of channels 132 to a default state, where the voltages of each channel 132 corresponds to a default value (e.g., a value of all logical zeros). In one embodiment, transmission unit 110A may be configured to perform the reset of interconnect 130 over several clock cycles in which unit 110A resets a portion of channels 132 during each cycle (clock cycles in which portions of interconnect 130 are reset may be referred to herein as "reset cycles") from an initial state of interconnect 130 at the start of the reset. For example, transmission unit 110A may discharge a third of channels 132 during a first reset cycle and the remaining two thirds during the next two cycles. In some embodiments, transmission unit 110A may further take multiple cycles to charge (or discharge) a give channel 132. By resetting interconnect 130 over several cycles instead of abruptly resetting all channels 132 simultaneously, transmission unit 110 reduces the likelihood of introducing noise into channels 132 due to strong transient currents.

Figure 2:
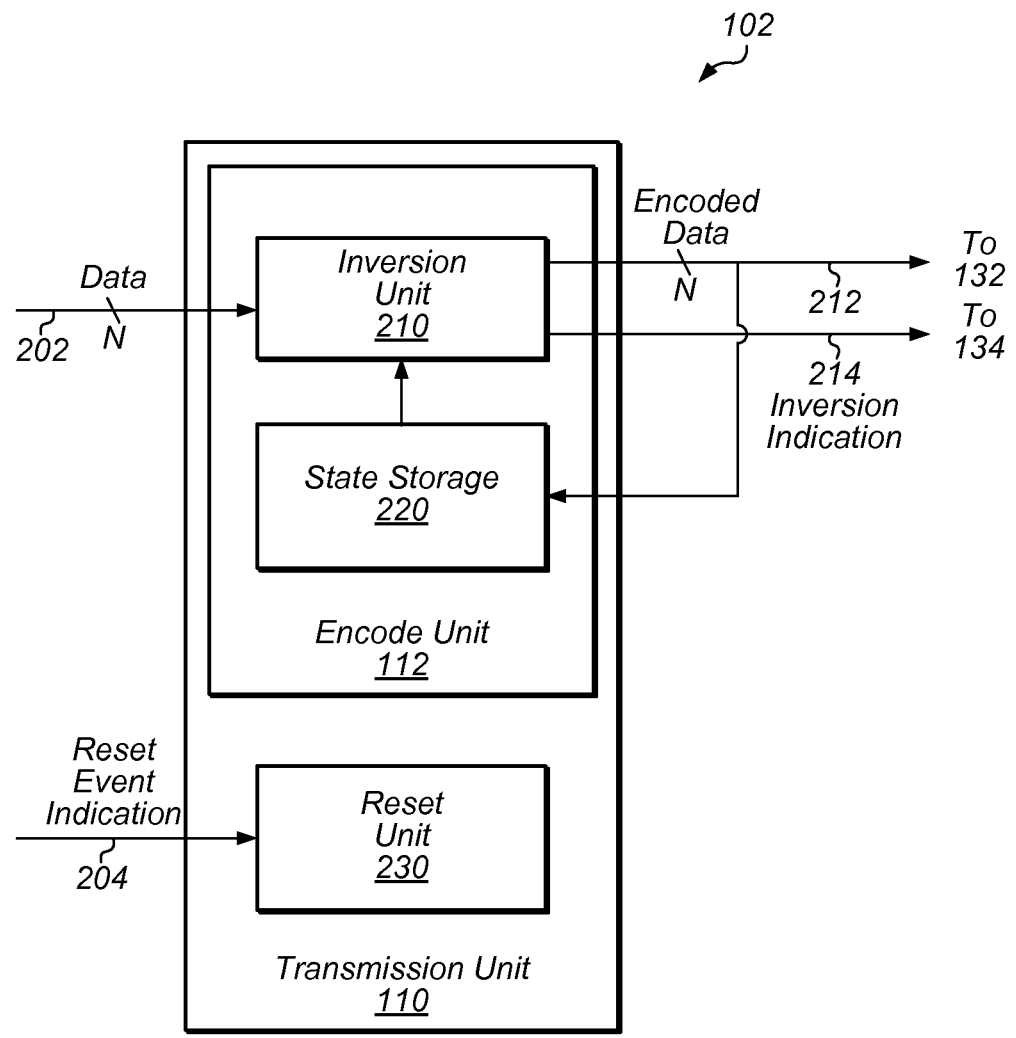
FIG. 2 is a block diagram illustrating one embodiment of a transmission unit in such a system.
Figure 3:
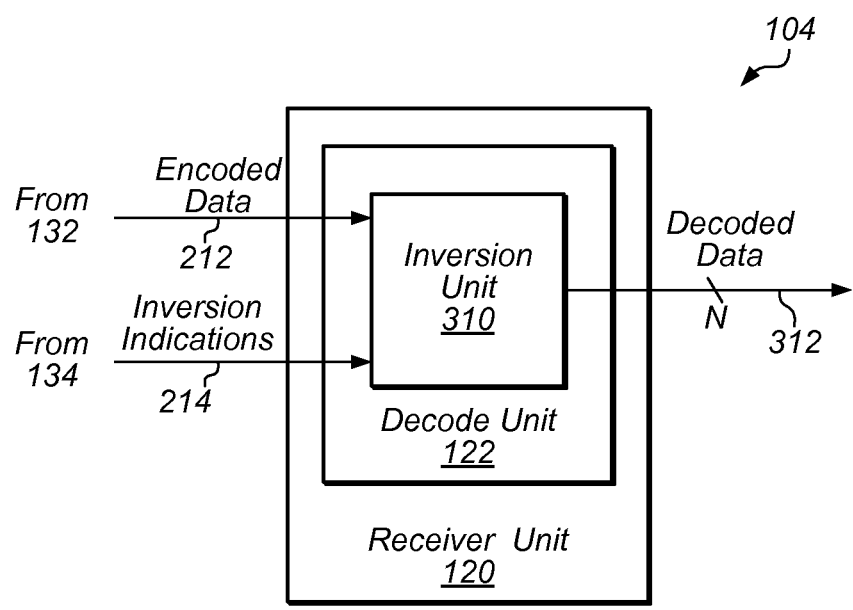
FIG. 3 is a block diagram illustrating one embodiment of a receiver unit in such a system.

Embodiments of transmission unit 110 and receiver unit 120 will now described in further detail in conjunction with FIGS. 2 and 3, respectively.

Turning now to FIG. 2, one embodiment of transmission unit 110 is depicted. In the illustrated embodiment, transmission unit 110 includes encode unit 112, which, in turn, includes an inversion unit 210 and state storage 220. Transmission unit 110 also includes a reset unit 230 (in other embodiments, reset unit 230 may be located elsewhere in devices 102 or 104).

Inversion unit 210, in one embodiment, is configured to encoding data 202 for transmission over interconnect 130 (as encoded data 212). To encode data 202 for a given transmission, inversion unit 210 may compare the data with the encoded data 212 of the previous transmission (which may be stored in state storage 202, in the illustrated embodiment) and invert the data 202 based on the comparison. In the illustrated embodiment, inversion unit 210 indicates the inversion (shown as inversion indication 214) via channel 134. In some embodiments, inversion unit 210 may provide multiple inversion indications 214 for a given transmission in a burst—e.g., for a 16-bit transmission, inversion unit 210 provide a first indication for the lower eight bits and a second indication for the upper eight bits. In one embodiment, inversion unit 210 continues to encode data 202 based on the previous transmissions of encoded bits 212 until a reset of interconnect 130 occurs. At which point, inversion unit 210 may encode an initial transmission based on the default state of interconnect 130.

Reset unit 230, in one embodiment, is configured to reset interconnect 130 when a reset event occurs. In the illustrated embodiment, reset unit 230 may determine that a reset event has occurred based on receiving one or more reset event indications 204. As discussed above, in various embodiments, a reset event indication 204 may be that traffic is going to change directions over interconnect 130. Accordingly, in some embodiments, this indication 204 is an indication that a processor is changing from performing a write operation to a read operation, or vice versa. For example, in one embodiment, this indication 204 may be a write command or a read command issued from a memory controller of a processor (as noted above, in some embodiments, a transmission unit 110 may be included in a memory controller PHY). If the memory controller issues a write command followed by a read command, reset unit 230 may determine that traffic is changing directions and thus may reset interconnect 130. In various embodiments, reset unit 230 may reset interconnect 130 in response to receiving an indication 204 that interconnect 130 is in an idle state. In one embodiment, this indication 204 may be an indication that a processor is entering a lower power state (e.g., an idle C-State) in which portions of memory may be entering a refresh mode, may be partially powered down, etc. In another embodiment, this indication 204 may be the lack of receiving a write or read command for a particular period of time. In still another embodiment, this indication 204 may be a received command to idle traffic over interconnect 130 for a predetermined period. In some embodiments, reset unit 230 may be configured to reset interconnect 130 at regular intervals.

In some embodiments, when reset unit 230 determines to reset interconnect 130, reset unit 230 is configured to reset interconnect 130 over several clock cycles such as described above. For example, in one embodiment, if channels 132 represent the state "11100110" at the start of a reset after a transmission, reset unit 230 may reset a first portion of non-adjacent channels 132 to a value of logical zero in a first reset cycle such as to the value "01100100." Rest unit 230 may then reset a second portion of channels 132 during a second cycle such as to the value "00100100." Finally, reset unit 230 may reset a third portion of channel 132 during a third cycle such as to the value "00000000." In some embodiments, reset unit 230 may also be configured to select the default state being used for the reset based on the initial state of interconnect 130 at the start of the reset. For example, in one embodiment, if the state of channels 132 at the start of a reset is mostly logical ones, reset unit 230 may determine to reset channels 132 to a default state of all logical ones (instead of determining to reset channels 132 to a default state of all logical zeros).

Turning now to FIG. 3, one embodiment of a receiver unit 120. As shown, receiver unit 120 includes a decode unit 122, which, in turn, includes an inversion unit 310. In the illustrated embodiment, inversion unit 310 is configured to decode encoded data 212 based on inversion indications 214 to produce decoded data 312. Accordingly, inversion unit 310 may be configured to invert a given transmission of data 212 if an inversion indication has a logical zero (or a logical one, in other embodiments) and may not invert the invert the transmission if it has a logical one. Receiver unit 120 may then distribute the data other units within device 104.

Figure 4:
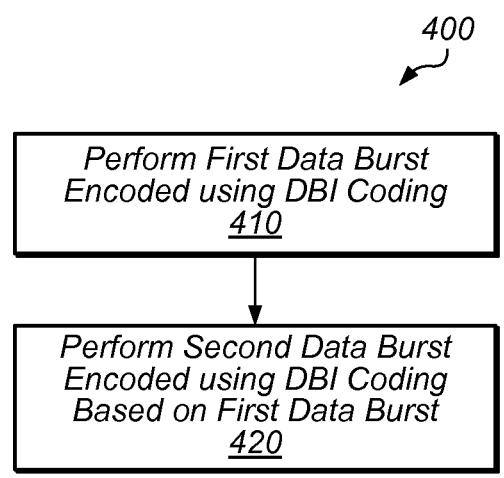
FIG. 4 is a flow diagram illustrating one embodiment of a method for encoding multiple data bursts.

Turning now to FIG. 4, a flow diagram of a method 400 for encoding multiple data bursts is depicted. Method 400 is one embodiment of a method that may be performed by a device such as device 102 (or device 104). In some instances, performance of method 400 may reduce noise caused by transient currents during bus switching. Performance of 400 may also reduce power consumption for transmitting data bursts.

In step 410, device 102 performs a first data burst. The data burst includes a first plurality of data transmissions, including a final data transmission. In various embodiments, data in each of the plurality of data transmissions is encoded using data bus inversion (DBI) coding. As discussed above, in one embodiment, device 102 is a graphics processing unit (GPU) configured to render images for a display and to perform data bursts via a system bus to a memory module that is configured to store information accessible to the GPU. In some embodiments, the data burst may correspond to a write operation or a read operation.

In step 420, device 102 performs a second data burst of a second plurality of DBI-coded data transmission, including an initial data transmission. In various embodiments, the initial data transmission of the second data burst is encoded using the final data transmission of the first data burst. In one embodiment, step 420 includes performing a comparison of the final data transmission of the first data burst and a set of data for the initial data transmission of the second data burst and, based on the comparison, inverting the set of data for transmission in the initial data transmission. In various embodiments, the first and second pluralities of data transmissions are transmitted in the same direction via a bidirectional bus. In some embodiments, the first and second data bursts correspond to two successive write operations or to two successive read operations.

In some embodiments, method 400 further includes device 102 performing a reset of the interconnect used to transmit the first and second data bursts. In one embodiment, a transmission unit of the device 102 transmits the first and second pluralities of data transmissions in a first direction via a bidirectional interconnect, and resets the interconnect to a default state in response to receiving an indication that a third plurality of data transmissions for a third burst is to be transmitted in a second opposite direction via the bidirectional interconnect. In one embodiment, the first and second bursts may correspond to successive read operations (or write operations), and the third data burst corresponds to a write operation (or a read operation). In some embodiments, the transmission unit resets a first set of bit lines of the interconnect during a first reset cycle and a second set of bit lines of the interconnect during a second reset cycle. In some embodiments, device 102 enters an idle state between performances of successive data bursts, and resets the data bus in response to entering the idle state. In some embodiments, the resetting includes at least three reset cycles.

Figure 5:
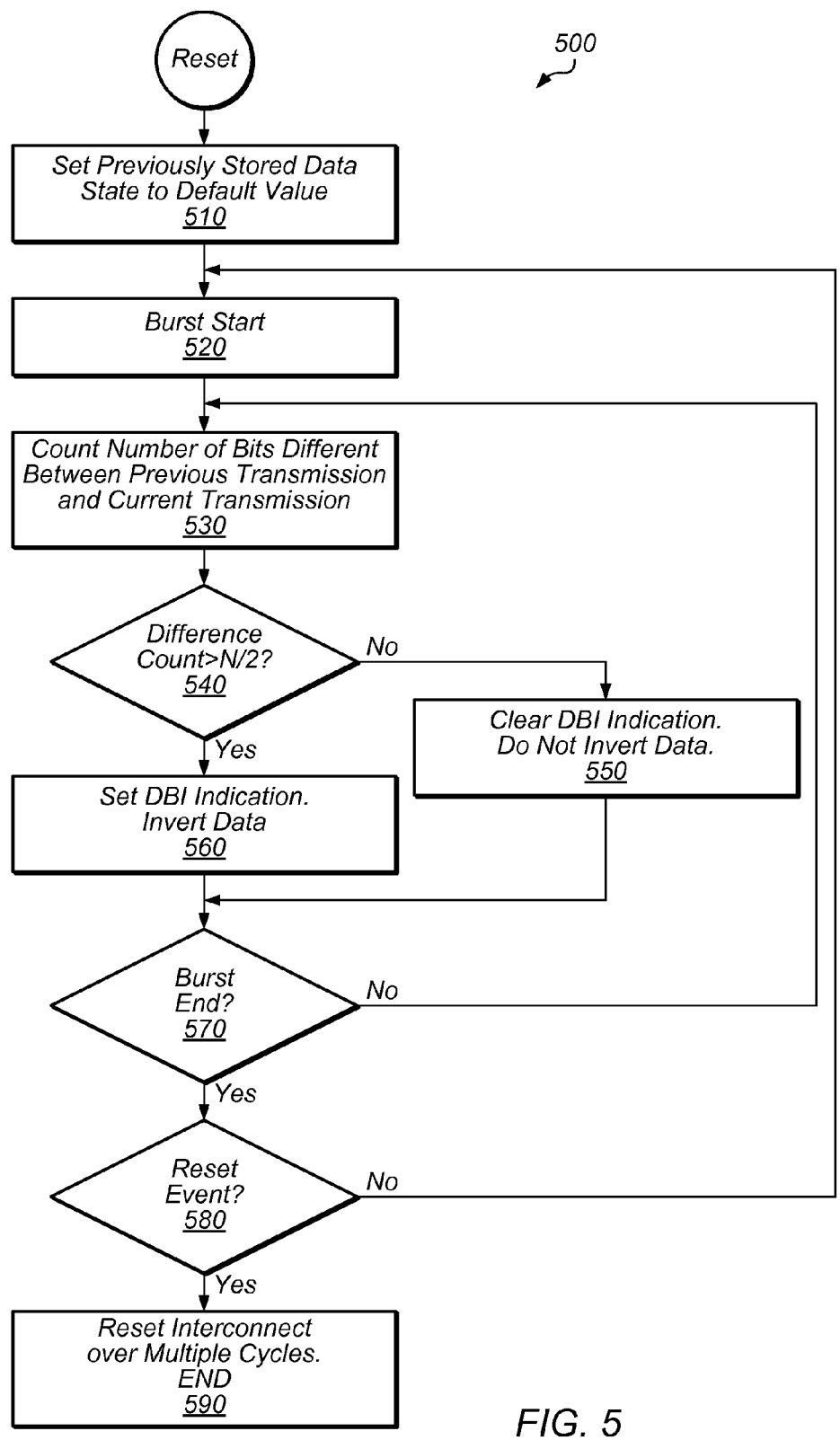
FIG. 5 is a flow diagram illustrating another embodiment of a method for encoding multiple data bursts.

Turning now to FIG. 5, a flow diagram of another method 500 for encoding multiple data bursts is depicted. Method 500 is another embodiment of a method that may be performed by a device such as device 102 (or device 104). Method 500 begins with an N-bit-wide interconnect (e.g., interconnect 130) being in a default state after a reset or an initialization of the interconnect. In step 510, the stored previous data state (e.g., in data storage 220) is set to the default value for the interconnect (e.g., all logical zeros). The device 102 begins a data burst, in step 520, and counts the number of bits differing from the previous transmission and the current transmission, in step 530. If the difference exceeds N/2 bits, device 102 clears the DBI indication (e.g., on line 134) and does not invert the data upon transmission, in step 550. If, however, the difference exceeds N/2 bits, device 102 sets the DBI indication and inverts the data, in step 560. Device 102 continues to send encoded transmissions until it determines that the burst has ended in step 570. If no reset event has occurred at 580, device 102 continues to perform encoded bursts using the state left by the last transmission of the pervious burst. Once a reset event occurs, device 102 resets the interconnect over multiple cycles, in step 590, as discussed above.

Exemplary Computer System

Figure 6:
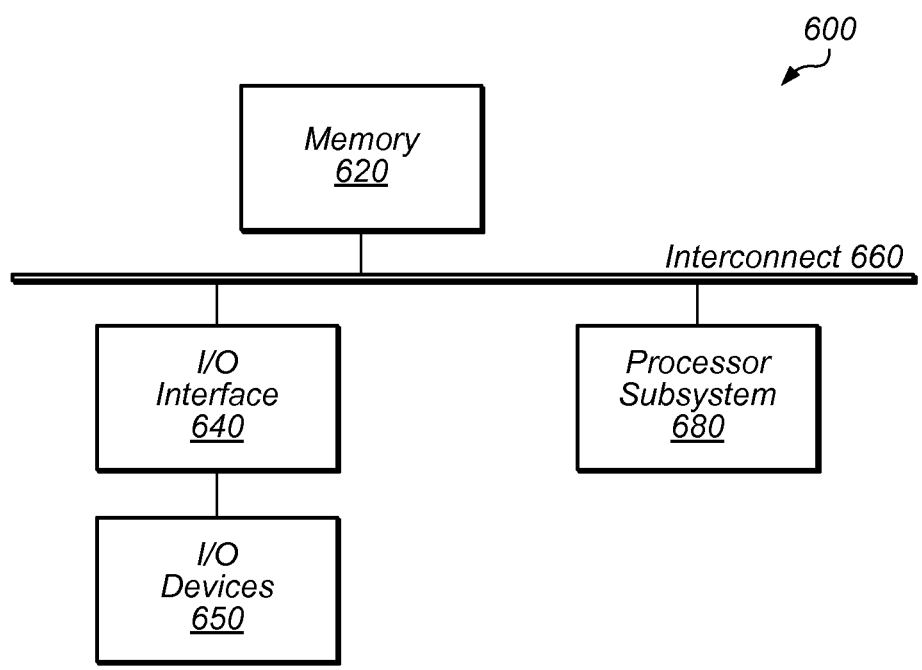
FIG. 6 is a block diagram illustrating one embodiment of an exemplary computer system.

Turning now to FIG. 6, one embodiment of an exemplary computer system 600, which may include system 100, include portions of system 100, or be included within system 100, is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Computer system 600 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 600 may also be any type of networked peripheral device such as storage devices, switches, modems, routers, etc. Although a single computer system 600 is shown for convenience, system 600 may also be implemented as two or more computer systems operating together.

Processor subsystem 680 may include one or more processors or processing units. For example, processor subsystem 680 may include one or more processing units (each of which may have multiple processing elements or cores) that are coupled to one or more resource control processing elements 620. In various embodiments of computer system 600, multiple instances of processor subsystem 680 may be coupled to interconnect 660. In various embodiments, processor subsystem 680 (or each processor unit or processing element within 680) may contain a cache or other form of on-board memory. In one embodiment, processor subsystem 680 may include a transmission unit 110 and/or receiver unit 120 described above.

System memory 620 is usable by processor subsystem 680. System memory 620 may be implemented using different physical memory media, such as hard disk storage, floppy disk storage, removable disk storage, flash memory, random access memory (RAM—static RAM (SRAM), extended data out (EDO) RAM, synchronous dynamic RAM (SDRAM), double data rate (DDR) SDRAM, RAMBUS RAM, etc.), read only memory (ROM—programmable ROM (PROM), electrically erasable programmable ROM (EEPROM), etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In one embodiment, system memory 620 may include a transmission unit 110 and/or receiver unit 120 described above.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device. In one embodiment, I/O interfaces 640 may include interconnect 130 described above.

Program instructions that are executed by computer systems (e.g., computer system 600) may be stored on various forms of computer readable storage media. Generally speaking, a computer readable storage medium may include any non-transitory/tangible storage media readable by a computer to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR1-DDR4, etc.) SDRAM, low-power DDR (LPDDR2, etc.) SDRAM, graphics DDR (GDDR3-5, etc.), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In some embodiments, a computer-readable storage medium can be used to store instructions read by a program and used, directly or indirectly, to fabricate hardware for system 100 described above. For example, the instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of system 100. The netlist may then be placed and routed to produce a data set describing geometric shapes to be applied to masks. The masks may then be used in various semiconductor fabrication steps to produce a semiconductor circuit or circuits corresponding to system 100.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
an interface circuit configured to perform first and second data bursts that include respective pluralities of data transmissions encoded using an inversion coding scheme, wherein an initial data transmission of the second data burst is encoded using a final data transmission of the first data burst.

2. The apparatus of claim 1, wherein the first and second data bursts correspond to successive write operations or successive read operations to a memory module.

3. The apparatus of claim 2, further comprising:
a graphics processing unit (GPU) configured to render images for a display, wherein the GPU includes the interface circuit within a memory controller interface; and
wherein the memory module is configured to store information accessible to the GPU.

4. The apparatus of claim 2, further comprising:
the memory module, wherein the memory module includes the interface circuit unit and a decode unit configured to decode received data bursts.

5. The apparatus of claim 2, wherein the interface circuit is coupled to a system bus, and wherein the interface circuit is further configured to reset the system bus to a default state in response to the system bus entering an idle state.

6. The apparatus of claim 1, wherein the interface circuit is configured to transmit data bursts to another interface circuit via an interconnect; and
wherein the interface circuit is configured to reset a first set of bit lines of the interconnect during a first cycle and a second set of bit lines of the interconnect during a second cycle.

7. The apparatus of claim 6, wherein the interconnect is configured to enter an idle state between performances of successive data bursts, and wherein the interface circuit is configured to perform the reset of the first and second sets of bit lines in response to entering the idle state.

8. The apparatus of claim 6, wherein the interconnect is a bidirectional interconnect, and wherein the interface circuit is configured to:
transmit the first and second pluralities of data transmissions in a first direction via the bidirectional interconnect; and
perform the reset of the first and second sets of bit lines in response to receiving an indication that a third plurality of data transmissions for a third burst is to be transmitted in a second direction via the bidirectional interconnect, wherein the first and second directions are opposite directions.

9. The apparatus of claim 1, further comprising:
a processing unit, wherein the processing unit includes the interface circuit;
wherein the interface circuit is configured to:
perform a comparison of the final data transmission of the first data burst and a set of data for the initial data transmission of the second data burst; and
based on the comparison, invert the set of data for transmission in the initial data transmission.

10. A method comprising:
performing a first data burst that includes a first plurality of data transmissions, including a final data transmission, wherein data in each of the plurality of data transmissions is encoded using data bus inversion (DBI) coding; and
performing a second data burst of a second plurality of DBI-coded data transmissions, including an initial data transmission, wherein the initial data transmission of the second data burst is encoded using the final data transmission of the first data burst.

11. The method of claim 10, wherein the first and second data bursts are transmitted via a bus, and wherein the method further comprises resetting the bus to a default state over a plurality of reset cycles.

12. The method of claim 11, wherein each of the plurality of reset cycles resets a respective set of bit lines of the bus, and wherein the resetting includes at least three reset cycles.

13. The method of claim 11, wherein the resetting is performed in response to the bus entering an idle state.

14. The method of claim 11, wherein the first and second pluralities of data transmissions are transmitted in the same direction via the bus, and wherein the resetting is performed in response to performing a third data burst of a third plurality of transmissions in a different direction than the first and second pluralities of transmissions.

15. The method of claim 10, wherein the first and second data bursts correspond to successive write operations and are performed by a memory controller interface of a processing unit.

16. The method of claim 10, wherein the first and second data bursts correspond to successive read operations and are performed by a memory module coupled to a processing unit.

17. The method of claim 10, wherein the performing a second data burst includes:
   comparing the final data transmission of the first data burst with data to be transmitted during the initial data transmission of the second data burst; and
   based on the comparing, inverting the data prior to transmitting the data during the initial transmission.

18. A computer readable storage medium comprising a data structure, which is operated upon by a program executable on a computer system, the program operating on the data structure to perform a portion of a process to fabricate an integrated circuit including circuitry described by the data structure, the circuitry described by the data structure including:
   an interface circuit configured to perform first and second data bursts that include respective pluralities of data transmissions encoded using an inversion coding scheme, wherein an initial data transmission of the second data burst is encoded using a final data transmission of the first data burst.

19. The computer readable storage medium of 18, wherein the integrated circuit is a graphics processing unit, and wherein the first and second data bursts correspond to successive write operations or successive read operations.

20. The computer readable storage medium of 19, wherein the storage medium stores hardware description language (HDL) data, Verilog data, or graphic database system II (GDSII) data.

* * * * *